Feb. 21, 1939.  F. P. HATHAWAY  2,147,771
FLOATING TOP CONTAINER
Filed Jan. 4, 1937
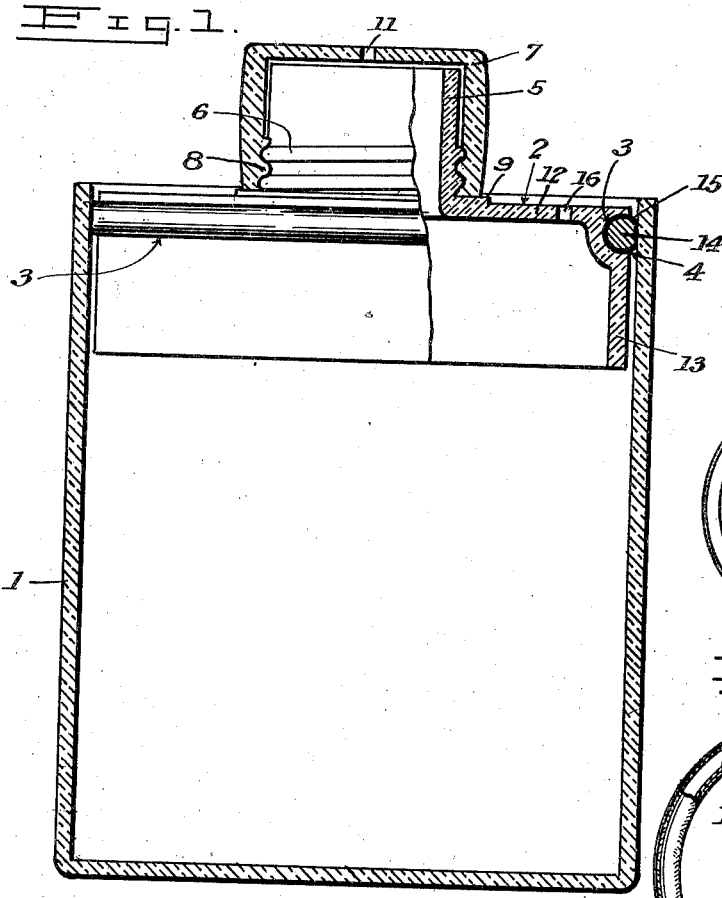
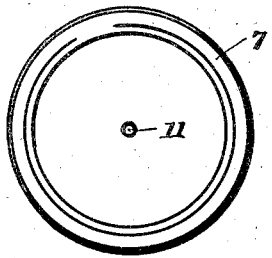
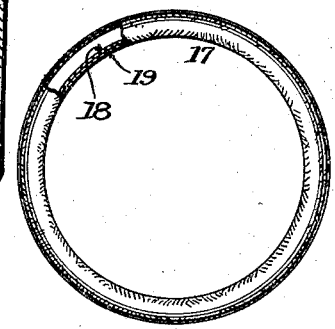
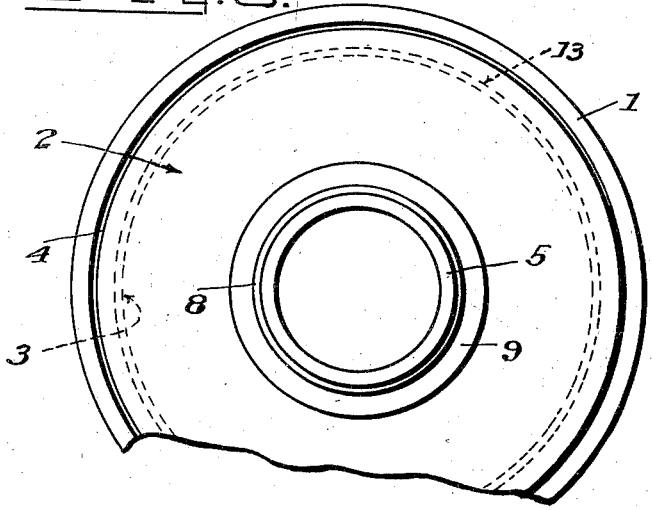
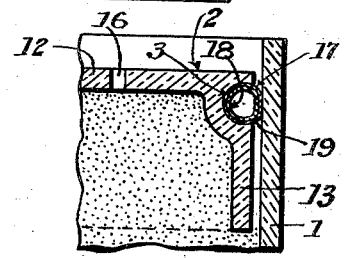
INVENTOR:
Frank P. Hathaway,
BY Alan Franklin
ATTORNEY.

Patented Feb. 21, 1939

2,147,771

UNITED STATES PATENT OFFICE 2,147,771

FLOATING TOP CONTAINER

Frank P. Hathaway, Los Angeles, Calif., assignor, by direct and mesne assignments, to Best Containers, Inc., a corporation of Nevada Application January 4, 1937, Serial No. 118,957

3 Claims. (Cl. 215—1)

This invention relates to containers, and more particularly to a dispensing container for such articles as tobacco, coffee, sugar, powdered milk and the like, from which air is eliminated by replacement of the top or cover after a predetermined portion of the contents thereof are removed.

The general object of the invention is to provide a novel container of the character stated with a slidable and floating top within the container jar, in air-tight contact with the side wall of said jar and provided with an air vent, so that said top may be moved down to any position within said jar upon the contents thereof, and expel the air therethrough so that the cover or top may be moved into close contact with the contents of the container, thereby to reduce to a minimum likelihood of spoiling said contents by air.

A more particular object of the invention is to provide a pneumatic gasket in the floating top of the container for engaging the inner surface of the side wall of the container jar and which forms an air-tight seal between said top and said jar wall, to prevent the admission of air between said top and said wall into said jar.

A further object of my invention is to provide a novel container jar and a novel cover or top therefor, and which cover or top may be easily and quickly removed from the container jar to expose the contents thereof for dispensing purposes, and which cover or top may be also quickly and easily replaced within the container jar and moved into substantial contact with the contents thereof so that a minimum amount of air remains within the container jar and underneath the cover and in communication with the contents of the jar, so that deterioration of such contents as a result of air coming in contact therewith will be reduced to a minimum.

The invention comprises the parts and combination of parts more particularly hereinafter set forth and defined in the claims appended hereto.

Other objects and advantages will appear hereinafter.

The invention is illustrated in the annexed drawing which forms a part of this specification and in which:

Fig. 1 is a vertical longitudinal section of my container.

Fig. 2 is a bottom plan view of the spout cap of the floating top of my container.

Fig. 3 is a fragmental top plan view of my container with the top spout removed.

Fig. 4 is a plan view partly broken away and shown in section showing a modified form of my invention in which the pneumatic gasket is used in the floating top of my container.

Fig. 5 is a fragmentary vertical longitudinal section of my container with the pneumatic gasket in position in the floating top of the container and in sealing position with the inner walls of the container jar.

Referring more particularly to the drawing in which corresponding parts are designated by the same reference characters in all of the figures, my container includes a container jar 1 and preferably of uniform cross-sectional dimension from top to bottom and having an opening at one end and being closed at its other end, a floating cover or top 2 fitted within said jar, which top is provided in its periphery with an annular groove or seat 3 in which is seated a gasket 4 in slidable contact with the inner surface $a$ of the side wall of said jar for closing the open end of the jar 1 and for forming an air-tight seal between said top and said jar wall to prevent the admission of atmospheric air between said top and said wall into said jar. The top 2 may be formed with a central spout 5, extending upwardly or outwardly therefrom, which is formed with an external thread 6, and a cap 7 fits over said spout and is formed with an internal thread 8 for engaging the spout thread 6 for securing said cap in position over said spout and closing the outer open end thereof, as shown in Fig. 1 of the drawing, there being a raised annular flat surface 9 formed on the outer side of the top 2 around the spout 5 against which surface the lower edge of the cap 7 is tightened, when said cap is drawn down on said spout by the engagement of the cap thread 8 with the spout thread 6, upon turning said cap to the right on said spout. The cap 7 is provided in its top wall with an air vent 11 that normally connects the interior of the container jar 1 with the atmosphere.

The jar 1, top 2 including its spout 5 and the cap 7 are made of any suitable material, such as glass, Bakelite, porcelain, wood or the like, and the jar is of uniform cross sectional dimension from top to bottom so that the top 2 may be slidably moved within the jar from top to bottom thereof or vice versa. The top 2 is formed with an upper wall 12 and an annular wall 13 depending from the edge of said upper wall, in the upper end of which annular wall is formed the annular seat 3 for the gasket 4, as shown in Fig. 1, which gasket comprises an annular solid ring 14 of any suitable resilient material, such as rubber, or other suitable material, preferably covered with a fabric covering 15 of suitable material such as cotton, silk, rayon or the like. The upper wall 12 of the top 2 may also be provided with an air vent 16 analogous to the air vent 11.

In Figs. 4 and 5 is illustrated a pneumatic gasket 17, which is seated in the annular seat 3 in the top 2 in place of the resilient but substantially solid gasket 4. Said gasket 17 comprises a tubular rubber ring 18, blown up with air and its air inlet closed by vulcanizing or otherwise, and said ring is preferably covered with a fabric covering 19, such as cotton, silk, rayon, or the like, which contacts with the inner surface $a$ of the side wall of the jar 1 and, under the air pressure within the rubber ring 18 forms an effective air seal against said inner surface of the side wall of the jar 1. The fabric covering 19 may, if desired, be treated or coated with paraffin or the like for lubrication thereof, so that it will slide more easily along the inner surface of the side wall of the jar.

The operation, uses and advantages of my invention are as follows:

The top 2 is withdrawn from the jar 1 through the upper end thereof, and any suitable article such as tobacco, coffee, sugar, powdered milk, or the like, is placed in said jar. The top 2 is then placed within the jar 1 and forced down upon the contents of the jar until the upper wall 12 of the top contacts with said contents and the spout 5 is filled with said contents up to the top wall of the cap 7, whereby the air in the jar is expelled therefrom through the air vents 11 and 16 and said vents are closed by said contents, thus shutting out the atmospheric air from the jar and preventing spoiling of the contents of the container by air because air will not then contact the contents of the jar through the openings 11 and 16 in sufficient quantities to affect the contents of the jar.

When it is desired to remove a quantity of the contents of the container, the cap 7 is unscrewed from the spout 5 and the desired quantity of said contents poured or otherwise taken out of the jar 1 through the open top of the spout 5. The cap 7 is then screwed on the spout 5 by the threads 6 and 8 and the top 2 forced down upon the contents of the jar until said contents contact with the upper wall 12 of said top and fill up the spout 5 to the top wall of the cap 7 and again close the air vents 11 and 16.

My container may be very easily and conveniently opened or closed and operated to eliminate the air therefrom as above set forth. The annular wall 13 of the floating top 2 may engage at its lower edge, the side wall of the jar 1 to prevent wobbling of the top in the jar and prevent the contents of the jar becoming lodged between the wall 13 and the side wall $a$ of the jar 1.

The contents of the container may be dispensed, otherwise than through the spout 5, when the cap 7 is removd from said spout, upon withdrawing the entire top 2 from the jar 1.

I do not limit my invention to the exact construction herein disclosed, because variations and modifications may be made without departing from the spirit of the invention, and I reserve the right to such variations and modifications.

I claim:

1. A container comprising a jar, a floating top movably fitted within said jar, a gasket covered with a fabric covering seated in said top in contact with the side wall of said jar, and means for venting air from said jar when said top is moved down upon the contents of said jar.

2. A container comprising a jar, a floating top movably fitted within said jar, a gasket covered with fabric treated with a lubricant, means for seating said gasket in said top in sliding airtight contact with the side wall of said jar, and means for venting air from said jar when said top is moved down upon the contents of said jar.

3. A container comprising a jar, a floating top fitted within said jar, a pneumatic gasket covered with fabric treated with a lubricant, means for seating said gasket in said top in sliding airtight contact with the side wall of said jar, and means for venting air from said jar when said top is moved down upon the contents of said jar.

FRANK P. HATHAWAY.